US008990442B2

(12) United States Patent
Saunders et al.

(10) Patent No.: US 8,990,442 B2
(45) Date of Patent: Mar. 24, 2015

(54) CONFIGURING SIGNALS BASED ON DEVICE CONDITIONS

(71) Applicant: Intel Corporation, Santa Clara, CA (US)

(72) Inventors: Bradley Saunders, Portland, OR (US); Robert Dunstan, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 64 days.

(21) Appl. No.: 13/681,890

(22) Filed: Nov. 20, 2012

(65) Prior Publication Data

US 2014/0143450 A1 May 22, 2014

(51) Int. Cl.
*G06F 3/00* (2006.01)
*G06F 5/00* (2006.01)
*G06F 13/00* (2006.01)
*G06F 13/12* (2006.01)

(52) U.S. Cl.
CPC .................................. *G06F 13/124* (2013.01)
USPC .................... 710/8; 710/36; 710/38; 710/107

(58) Field of Classification Search
None
See application file for complete search history.

(56) References Cited

U.S. PATENT DOCUMENTS

| 8,157,575 | B1 * | 4/2012 | Matsuoka | 439/131 |
| 2007/0288677 | A1 * | 12/2007 | Mambakkam et al. | 710/301 |
| 2009/0124125 | A1 * | 5/2009 | Chatterjee | 439/607.05 |
| 2013/0244489 | A1 * | 9/2013 | Terlizzi et al. | 439/620.01 |

* cited by examiner

*Primary Examiner* — Kris Rhu

(74) *Attorney, Agent, or Firm* — International IP Law Group, P.L.L.C.

(57) ABSTRACT

A method, of configuring contacts of a receptacle based on determined conditions is disclosed. The method may include receiving, via contacts of a receptacle, a plug communicatively coupled to a peripheral device. The method may also include receiving, via a control channel communicatively coupled to one or more of the contacts, a signal related to conditions of the peripheral device including a first bus type and a second bus type of the peripheral device. The method may also include determining, via a controller communicatively coupled to the control channel, the conditions of the peripheral device. The method may also include configuring the contacts based on the determined conditions, wherein configuring the contacts comprises routing a first set of contacts corresponding to the first bus type to a first interface and routing a second set of contacts corresponding to the second bus type to a second interface.

23 Claims, 5 Drawing Sheets

100

200

*500*

CONFIGURING SIGNALS BASED ON DEVICE CONDITIONS

TECHNICAL FIELD

This disclosure relates generally to systems, methods, and a receptacle to enable assignment of signals within the receptacle. Specifically, the disclosure relates to configuring the signals based on determined conditions of a peripheral device, and a host computing device communicatively coupled via the receptacle.

BACKGROUND ART

Today's computers support a wide variety of interface technologies for communicating with peripheral devices. Different interface technologies provide different advantages depending on the type of peripheral device being connected. Each interface technology may have its own communication protocol, pin layout, and physical connector style, among other differences. As a result, most computers provide a wide variety of connector styles to support a variety of interface technologies, which adds to the cost of such devices and places a burden on the user to correctly identify which connector style is suitable for a particular peripheral device.

BRIEF DESCRIPTION OF THE DRAWINGS

The same numbers are used throughout the disclosure and the figures to reference like components and features. Numbers in the 100 series refer to features originally found in FIG. 1; numbers in the 104 series refer to features originally found in FIG. 2; and so on.

DESCRIPTION OF THE EMBODIMENTS

The present disclosure describes techniques for providing a reconfigurable receptacle that enables dynamic assignment of signals provided to contacts of the receptacle. When connecting a peripheral device via a cable to a receptacle of a host computing device, the peripheral device may communicate the conditions of the peripheral device, including the characteristics of one or more bus types of the peripheral device, via a control channel within the receptacle. The controller may then configure the signals provided to contacts within the receptacle based on the conditions of the peripheral device. The host computing device may also communicate the conditions of the host computing device to the control channel and may negotiate a best host computing device to peripheral device configuration based on any combination of the conditions of the host computing device and the peripheral device. The conditions, as referred to herein, refer to the functional characteristics of a component. The functional characteristics may include software capabilities of the component, hardware capabilities of the component, security features of the component, a bus type of the component, and the like. As referred to herein, configuration of contacts refers to configuration of signals provided to the contacts. The signals provided to the contacts of the receptacle may be configured based on the specifics of the host computing device to peripheral device configuration. Furthermore, the configuration of the connector interfaces may be dynamically adjusted over time based on changing usage conditions.

Figure 1:
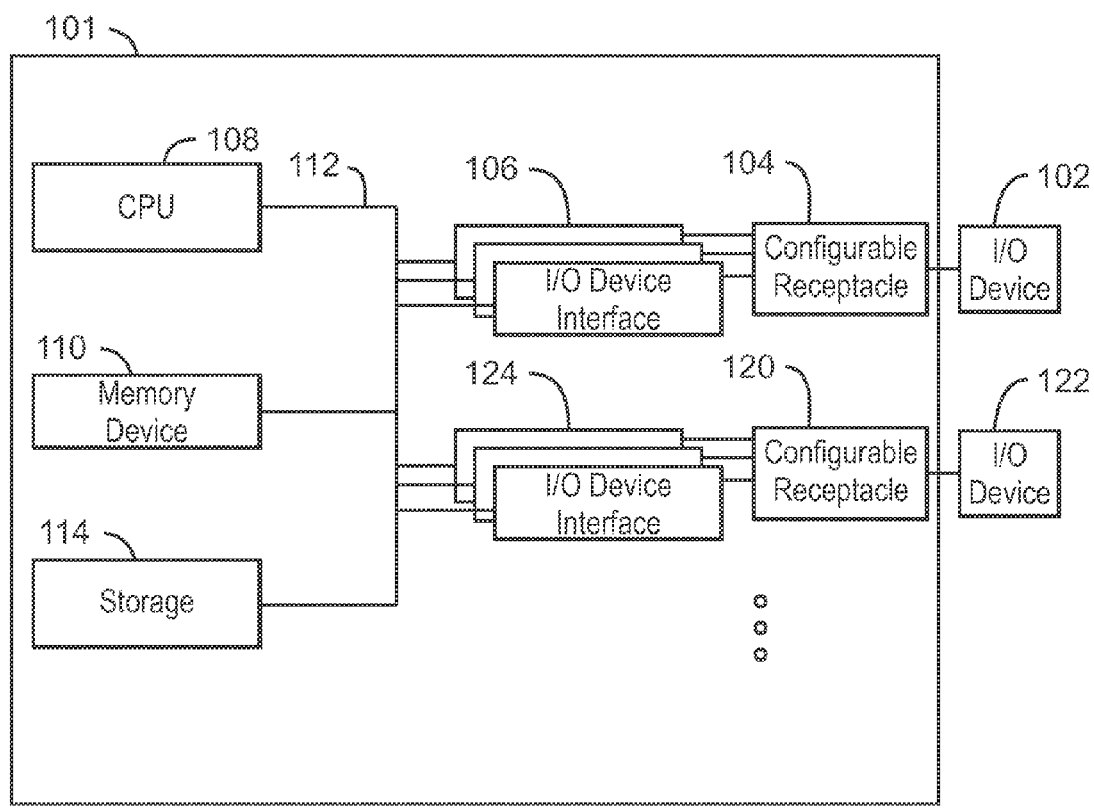
FIG. 1 is a block diagram of a system including a host computing device communicatively coupled to a peripheral input/output (I/O) device.

FIG. 1 is a block diagram of a system 100 including a host computing device 101 communicatively coupled to a peripheral input/output (I/O) device 102, herein referred to as "peripheral device 102." The system 100 configures contacts of a configurable receptacle 104 based on determined conditions of the peripheral device 102. The configurable receptacle 104 may be part of the host computing device 101. The host computing device 101 may also include one or more I/O device interfaces 106 configured to communicate with the peripheral device 102 based on the determined conditions of the peripheral device 102.

The host computing device 101 may be, for example, a laptop computer, desktop computer, tablet computer, mobile device, server, or cellular phone, among others. The host computing device 101 may include a main processor 108 that is adapted to execute stored instructions, as well as a memory device 110 that stores instructions that are executable by the main processor 108. The main processor 108 can be a single core processor, a multi-core processor, a computing cluster, or any number of other configurations. The main processor 108 may be implemented as Complex Instruction Set Computer (CISC) or Reduced Instruction Set Computer (RISC) processors, x86 Instruction set compatible processors, multi-core, or any other microprocessor or central processing unit (CPU). In some embodiments, the main processor 108 includes dual-core processor(s), dual-core mobile processor (s), or the like.

The memory device 110 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The instructions stored in the memory device 110 and that are executed by the main processor 108 may be used to configure contacts of the configurable receptacle 104 based on the determined conditions of the peripheral I/O device 102.

The main processor 108 may be connected through a system bus 112 (e.g., PCI, ISA, PCI-Express, HyperTransport®, NuBus, etc.) to the I/O device interface 108 adapted to connect the host computing device 101 to the peripheral device 102. The peripheral device 102 may include, for example, a keyboard and a pointing device, wherein the pointing device may include a touchpad or a touchscreen, a peripheral device such as a camera, a media player, a printer, among others. The peripheral device 102 may be a computing device similar to the host computing device 101.

The host computing device 101 may also include a storage device 114. The storage device 114 may include a physical memory such as a hard drive, an optical drive, a flash drive, an array of drives, or any combinations thereof. The storage device 114 may also include remote storage drives. The storage device 114 may store instructions thereon to provide support for configuring the contacts of the configurable receptacle 104 based on the conditions of the peripheral device 102.

The contacts (not shown) of the receptacle 104 may be configured to interface with the peripheral device 102 via a plug (not shown) communicatively coupled to the peripheral device 102 via a cable (not shown). One of the contacts may be communicatively coupled to a control channel (not shown) to receive a data signal related to the conditions of the peripheral device 102 and the cable. The control channel may enable the contacts of the receptacle 104, other than the contact communicatively coupled to the control channel, to be configured based on the determined conditions of the peripheral device 102. The I/O device interfaces 106 may be configured to connect selected interfaces with the peripheral device 102 based on the conditions of the peripheral device 102 including a first bus type of the peripheral device 102 and a second bus type of the peripheral device 102. Further, the receptacle 104 may include a first set of contacts (not shown) and a second set of contacts (not shown). Configuring the contacts may include routing the first set of contacts corresponding to the first bus type to a first interface and routing the second set of contacts corresponding to the second bus type to a second interface. In some embodiments, the host computing device 101 may include a controller (not shown) to dynamically configure the first set of contacts and the second set of contacts based on changing usage conditions.

In embodiments, the host computing device 101 may include an additional receptacle 120. The additional receptacle 120 may be configured to interface with an additional peripheral device 122. The host computing device 101 may include an additional I/O device interface 124 configured to interface with the peripheral device 122 based on the conditions of the peripheral device 122 including a first bus type of the peripheral device 122 and a second bus type of the peripheral device 122.

Figure 2:
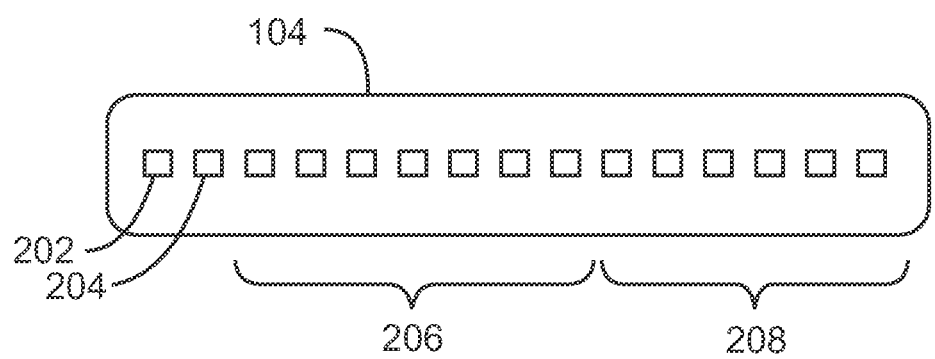
FIG. 2 is a block diagram illustrating a receptacle including a contact communicatively coupled to a control channel configured to receive a data signal related to conditions of the peripheral device.

FIG. 2 is a block diagram illustrating a receptacle 104 including a contact 202 communicatively coupled to a control channel (not shown) configured to receive a data signal related to conditions of a peripheral device, such as the peripheral device 102 of the system 100 of FIG. 1. In some embodiments, the contact 202 is a first contact, and a signal providing the conditions of the peripheral device is a differential signal where a second contact 204 as well as the first contact 202 is configured to receive a signal related to the conditions. Further, the receptacle 104 may include a first set of contacts 206 and a second set of contacts 208. Configuring the contacts 206, 208 may include routing the first set of contacts 206 corresponding to the first bus type to a first interface and routing the second set of contacts 208 corresponding to the second bus type to a second interface. In some embodiments, the controller (not shown) dynamically configures the first set of contacts 206 and the second set of contacts 208 based on changing usage conditions. In some embodiments, the second set of contacts 208 are statically defined contacts based on the conditions including the interface protocol associated with the peripheral device.

Figure 3:
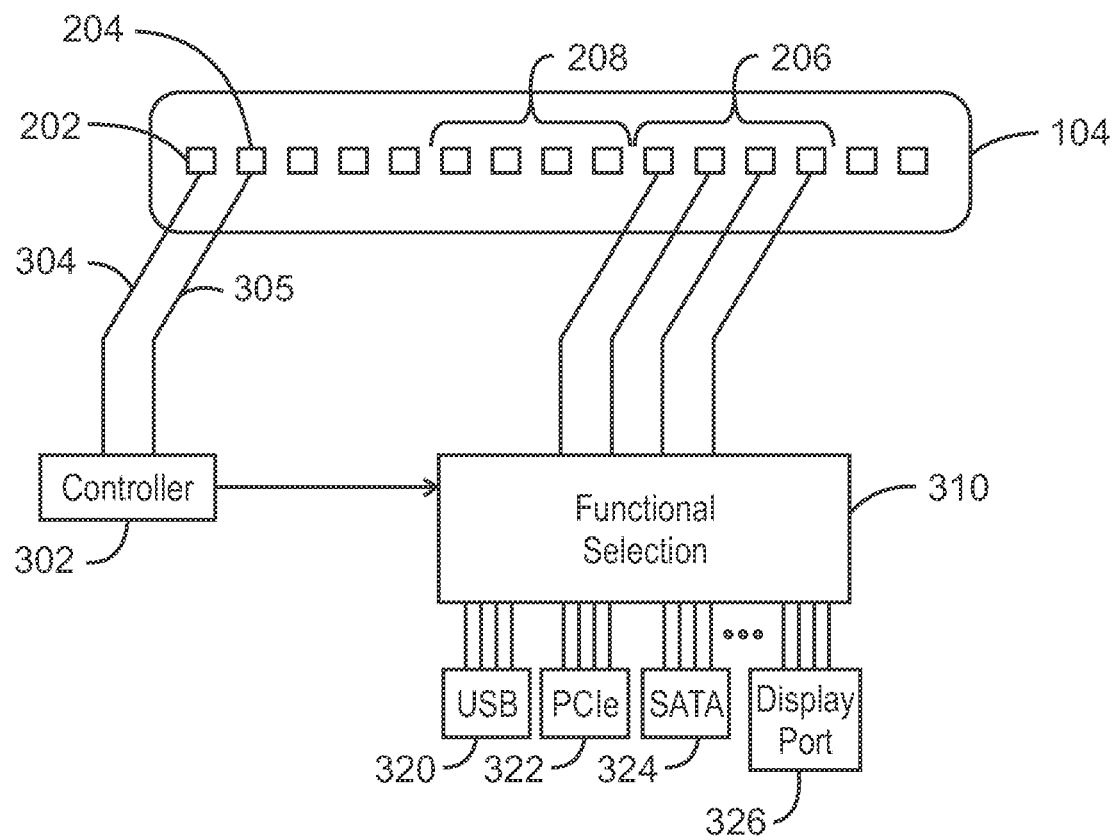
FIG. 3 is a block diagram illustrating a receptacle and a controller communicatively coupled to a control channel.

FIG. 3 is a block diagram illustrating a receptacle 104 and a controller 302 communicatively coupled to a control channel 304. The control channel 304 may be communicatively coupled to the contact 202. In the case of differential signaling, the controller may be coupled via an additional control channel 305 to the contact 204. The control channel 304 may be configured to receive a signal related to conditions of a peripheral device, such as the peripheral device 102 in the system 100 of FIG. 1. The controller 302 may be communicatively coupled to the control channel 304 and may be configured to determine the conditions of the peripheral device, and may configure contacts 206, 208 based on the determined conditions. The conditions of the peripheral device may include a first bus type of the peripheral device and a second bus type of the peripheral device. The contacts 206 may be a first set of contacts, and the contacts 208 may be a second set of contacts 208. Configuring the contacts 206, 208 may include routing the first set of contacts 206 corresponding to the first bus type to a first interface and routing the second set of contacts 208 corresponding to the second bus type to a second interface. In some embodiments, the controller 302 dynamically configures the first set of contacts 206 and the second set of contacts 208 based on changing usage conditions.

In some embodiments, the controller 302 may be remote from a functional control mechanism 310 and may be communicatively coupled to the functional selection mechanism 310 to configure each of the contacts 206, 208 based on the determined conditions. In other embodiments, the functional selection mechanism 310 may be part of the controller 302.

The controller 302 may include a mechanism to determine the conditions of the peripheral device. In some embodiments, a plug (not shown) may have a resistor coupled across the plug contacts that interface with the control channel 304. The level of the resistance may indicate conditions of the peripheral device, such as the bus type, bus speed, and number of lanes, among others. The controller 302 may include a detector (not shown) configured to determine the resistance level of the resistor coupled to the control channel. The controller may direct the functional selection mechanism 310 to configure the contacts 206, 208 based on the identified resistance level. In other embodiments, the controller 302 may be configured to receive data signals from the peripheral device via the control channel related to the conditions of the peripheral device. The controller 302 may direct the functional selection mechanism 310 to configure the contacts 206, 208 based on the data signals.

The conditions of the peripheral device may include the type of the peripheral device and the communication interface or bus type used by the peripheral device. For example, the peripheral device may be a camera including a storage device. The controller may configure the contacts based on the bus type of the peripheral device as a camera rather than as a storage device.

The peripheral device may have a device state including when the peripheral device is connected to a direct power source, or when the peripheral device is connected to a battery source. The conditions of the peripheral device may include the device state and changes of the device state. The device state may be changed by a user dynamically while the peripheral device is connected to the controller 302 in which case the controller 302 may reconfigure the contacts based on changes in the state of the peripheral device. For example, the peripheral device may be connected to a direct power source rather than a battery source. In this example, the controller 302 may only configure the contacts to provide power to the peripheral device when the peripheral device is connected to a battery power source rather than a direct power source.

In some embodiments, the receptacle 104 is communicatively coupled to a host computing device (not shown), and the conditions may include data encryption relating to a data encryption of the data signal provided from the peripheral device. The control channel 304 may establish trust between the peripheral device and the host computing device. For example, the peripheral device may be connected to a host computing device, and either of the peripheral device and the host computing device may have specific security protocols related to communicating with another device. The conditions may indicate the security protocols including whether the peripheral device may communicate with the host computing device based on the security protocols.

In some embodiments, the conditions may include a request by the peripheral device to reconfigure one of the contacts dynamically during communication between the host computing device and the peripheral device. For example, the peripheral device may request that at least one of the contacts be reconfigured based on other conditions such as the change of bus type described above. As another example, the peripheral device may request that at least one of the contacts be reconfigured based on the security protocols of the host computing device. Other examples are contemplated in which the contacts may be reconfigured dynamically based on a change in conditions.

In some embodiments, the conditions may include hierarchical relationship between the host computing device and the peripheral device. In other embodiments, the conditions of the peripheral device including number of lanes, operational speeds, default mapping, lane mappings, and the like. In yet other embodiments, the conditions may include a request by the peripheral device to cause the host computing device to provide a data signal related to conditions of the host computing device.

The controller 302 may include a host interface controller to select from among available interface protocols based on the peripheral device conditions including the interface protocol configuration of the peripheral device. The functional selection mechanism 310 may configure the contacts 206, 208 to communicate via a bus type associated with a high performance interface protocol, such as peripheral component interconnect (PCI) Express 322, universal serial bus (USB) 320, DisplayPort 326, serial ATA (SATA) 324, and the like. In some embodiments, the functional selection mechanism 310 may also configure the contacts 206, 208 to communicate via bus type associated with a low performance interface protocol, such as I²C, system management bus, serial peripheral interface, and the like. The functional selection mechanism 310 may route the contacts 206, 208 to one or more of the high performance interface protocols 320, 322, 324, 326. In embodiments, the contacts 206, 208 may include a first set of contacts routed to a first high performance interface protocol, such as the USB protocol 320, and a second set of contacts routed to a second high performance interface protocol, such as the PCIe protocol 322. In embodiments, the functional selection mechanism 310 may also configure the contacts 206, 208 to communicate via individual control sideband signals. The functional selection mechanism 310 may offer adjustable configurations which may include control-channel-management in terms of data channel widths, such as multi-lane or data channel bonding. The adjustable configurations may also include symmetry management including unidirectional management of data signals, balanced bi-directional management of data signals, and asymmetrical bi-directional management of data signals.

In some embodiments, the functional selection mechanism 310 may include simple routing switches (either discrete or integrated into system via integrated circuits). The specific implementation is immaterial to the present disclosure, as along as the functional selection mechanism 310 configures the contacts 206, 208 based on the determined conditions of the device, and in some cases the host computing device.

The nature and implementation of the functional selection mechanism 310 may vary within a given device, and may be configured to determine what functional options are available and which overall device-to-device configuration is advantageous depending on the conditions of the peripheral device. In some embodiments, the conditions of the host computing device may also be evaluated to configure the contacts, either the first set of contacts 206, 208 or the second of contacts 309 of the receptacle 104. In some embodiments, the contacts 206, 208 may be configured based on the best device-to-device configuration.

Figure 4:
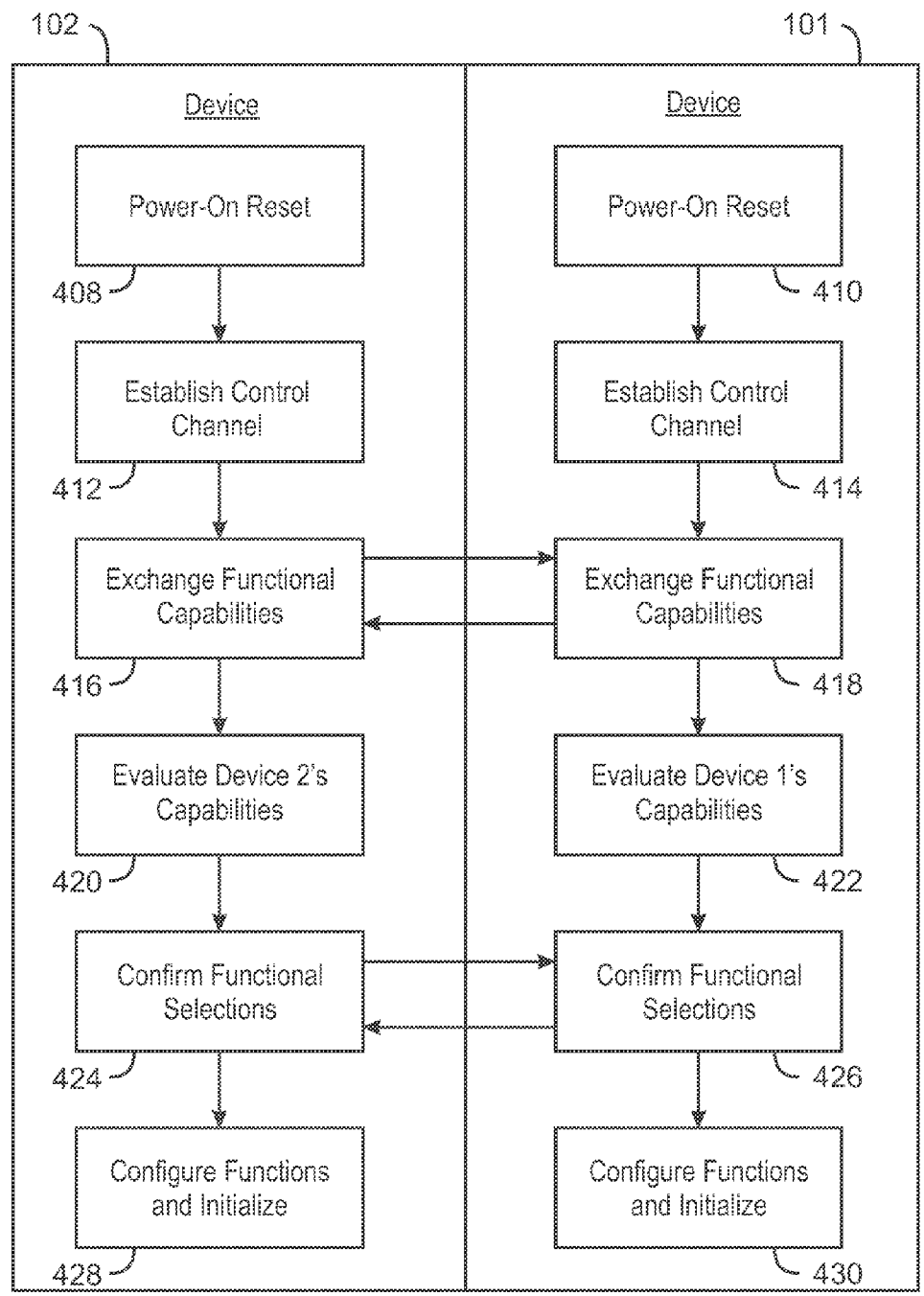
FIG. 4 is a flow diagram to configure signals of a receptacle based on determined conditions of a peripheral device and a host computing device.

FIG. 4 is a flow diagram to configure signals of a receptacle based on determined conditions of the peripheral device 102 and the host computing device 101. In some embodiments, the receptacle is communicatively coupled to the host computing device 101. The contacts are configured based on the conditions of the peripheral device 102 as well as the conditions of the host computing device 101. As illustrated in FIG. 4, conditions of the host computing device 101 may be communicated to the peripheral device 102. Each device 102, 101 may power-on at block 408, 410. A control channel is established at block 412, 414 between the peripheral device 102 and the host computing device 101. At blocks 416, 418 the conditions of the each of the peripheral device 102 and the host computing device 101 may be exchanged. The conditions may include the functional capabilities of each of the peripheral device 102 and the host computing device 101. At block 420, the conditions of the host computing device 101 may be evaluated by the peripheral device 102. At block 422, the conditions of the peripheral device 102 may be evaluated by the host computing device 101. Although not shown in FIG. 4, the conditions of the peripheral device 102 and the host computing device 101 may be evaluated by each of the peripheral device 102 and the host computing device 101. At blocks 424 and 426, the conditions of each of the peripheral device 102 and the host computing device 101 may be confirmed by exchanging the determined conditions. At blocks 428 and 430, each of the peripheral device 102 and the host computing device 101 may configure functions based on the conditions of each device and initialize those functions via the contacts of a receptacle of the host computing device. In this manner, the devices 102, 101 may negotiate an advantageous configuration of the contacts of the receptacle specific to the device-to-device configuration implemented.

In some embodiments, the contacts of the host computing device 101 may be configured dynamically. The host computing device 101 may determine that the conditions of the peripheral device 102 have changed after an initial configuration of the contacts. Therefore, the contacts may be reconfigured to reflect the changed conditions of the peripheral device 102. In some embodiments, the peripheral device 102 may determine that the conditions of the host computing device 101 have changed after an initial configuration of the contacts. Therefore, the contacts may be reconfigured to reflect the changed conditions of the host device 101. The dynamic configuration of the contacts enables the device-to-device connection configuration to reconfigure after the initial configuration based on changes in the peripheral device 102, the host computing device 101, or changes in both. The dynamic configuration of contacts may also include configuration based on different bus types and interface protocols (i.e. USB, PCIe, and the like) depending on the different types of uses of the device, such as a camera being used as a peripheral storage device or a peripheral camera.

Figure 5:
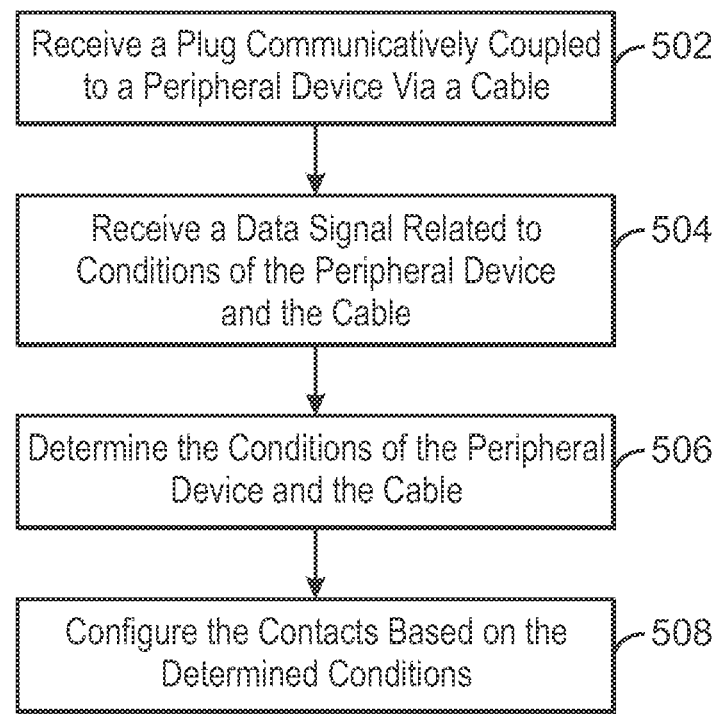
FIG. 5 is a block diagram illustrating a method to configure signals provided to contacts of a receptacle based on determined conditions of a peripheral device.

FIG. 5 is a block diagram illustrating a method 500 to configure signals provided to contacts of a receptacle based on determined conditions of a peripheral device. The conditions of the peripheral device may include a first bus type of the peripheral device and a second bus type of the peripheral device.

The method 500 may include receiving 502, via contacts of a receptacle, a plug communicatively coupled to a peripheral device via a cable. The method 500 may also include receiving 504, via a control channel communicatively coupled to one or more of the contacts, a signal related to conditions of the peripheral device. The conditions may include a first bus type of the peripheral device and a second bus type of the peripheral device. The method 500 may also include determining 506, via a controller communicatively coupled to the control channel, the conditions of the peripheral device. The method 500 may also include configuring 508 the contacts based on the determined conditions. Configuring 508 the contacts may include routing a first set of contacts corresponding to the first bus type to a first interface and routing a second set of contacts corresponding to the second bus type to a second interface.

In some embodiments, the method 500 may further include dynamically configuring the first set of contacts and the second set of contacts based on changing usage conditions. For example, the conditions may include the intended use of the peripheral device which may change dynamically. Therefore, the method 500 may also include configuring the contacts based on an intended use of the peripheral device. For example, the peripheral device may be a storage device with a functional capability of a media player. However, the peripheral device may be used as a storage device when connected rather than a media player. Therefore, the contacts of the receptacle may be configured based on the conditions of the intended use as a storage device.

In some embodiments, the method 500 may also include reconfiguring the contacts based on changes in a state of the peripheral device including whether the peripheral device is connected to a direct power source or a battery power source. As mentioned above in reference to FIG. 3, the device state, including whether the peripheral device is connected to a direct power source may indicate that power is not required to be provided from the host computing device, and the contacts may be reconfigured to provide power to the peripheral device only when the peripheral device is not connected to a direct power source.

The conditions provided by the device may indicate that a bus type associated with an interface protocol of the peripheral device, such as USB, PCI Express, and the like. Therefore, the method 500 may also include selecting from among available interface protocols based on the peripheral device conditions.

In some embodiments, the plug may include contacts to interface with the control channel of the receptacle. The plug may also include a resistor coupled across the contacts of the plug that interface with the control channel. In embodiments, the method 500 may further include determining a level of resistance to indicate the conditions of the peripheral device. In other embodiments, the plug may include a capacitor communicatively coupling one or more contacts of the plug wherein the capacitor is configured to receive a capacitance value indicating the conditions of the peripheral device. In other embodiments, the method may include receiving data signals at the controller. The data signals may indicate the conditions the peripheral device, and, in some cases, the host computing device.

In some embodiments, the receptacle is communicatively coupled to a host computing device, and the contacts are configured based on the conditions of the peripheral device as well as the conditions of the host computing device. The conditions of the host computing device may include a hierarchical relationship between the host computing device and the peripheral device. The conditions may also include one or more of: security protocols including data encryption relating to a data encryption of the data signal provided from the peripheral device, authentication of the peripheral device to the host computing device, and attestation of the peripheral device to the host computing device; a request by the peripheral device to reconfigure one of the contacts dynamically during communication between the host computing device and the peripheral device; conditions of the peripheral device including number of lanes, operational speeds, default mapping, lane mappings; and a request by the peripheral device to cause the host computing device to provide a data signal related to conditions of the host computing device.

The conditions may also include the capabilities of either the peripheral device or the host computing device. The capabilities may include bus types supported such as USB, SATA, PCIe, Display Port, and the like. The capabilities may also include the number of bus types. The capabilities may also include the number of unique bus type requirements in the peripheral device. In some embodiments, the number of unique bus type requirements may be doubled for ports on the peripheral device that can operate as either a device or host. The capabilities may also include whether the peripheral device operates as a host computing device, peripheral device, or both. The capabilities may also include the number of lanes each host controller can support. The capabilities may also include lane mappings available for each bus type, the lane mappings for the controller, and the number of lane configurations to physical lanes. The capabilities may also include operational speeds for each host controller—e.g. 1.5, 3, 6 Gbps for SATA. The capabilities may also include any default contact configurations.

The conditions may also include requests from the peripheral device to the host computing device or from the host computing device to the peripheral device. The requests may include requests for capabilities of either the peripheral device or the host computing device. The requests may also include a request for specific mapping of the controllers to physical lanes to match the peripheral device's requirements. The requests may also include a request for the controller configuration. For example, the controller configuration may include operational speed after reset, alternate function enabling the peripheral device to operate as a peripheral device rather than a host device for P2P connection. The controller may configure the first set of contacts as a USB host due to the controller configuration and based on the conditions of the peripheral device, while the controller may configure the second set of contacts as a PCIe master based on the conditions of the peripheral device operating as a host computing device. The requests may also include a reconfiguration request when the contacts are configured dynamically.

The conditions may also include bus management. The bus management conditions may include a master reset condition configured to restore the controller and contacts into an un-configured state. The management conditions may also include a soft or partial reset configured to restore the controller and the contacts into a partially un-configured state.

Some embodiments may be implemented in one or a combination of hardware, firmware, and software. Some embodiments may also be implemented as instructions stored on a tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A receptacle, comprising:
   contacts to receive a plug communicatively coupled to a peripheral device;
   a control channel communicatively coupled to one or more of the contacts, the control channel to receive a signal related to conditions of the peripheral device including a first bus type and a second bus type of the peripheral device; and
   a controller communicatively coupled to the control channel to determine the conditions of the peripheral device and configure the contacts of the receptacle based on the determined conditions, wherein the controller is to configure the contacts of the receptacle comprising to route a first set of contacts corresponding to the first bus type to a first interface and to route a second set of contacts corresponding to the second bus type to a second interface, wherein the receptacle is communicatively coupled to a host computing device, and wherein the conditions comprise a request by the peripheral device to reconfigure one of the first or second set of contacts dynamically during communication between the host computing device and the peripheral device.

2. The receptacle of claim 1, wherein the controller dynamically configures the first set of contacts and the second set of contacts based on changing usage conditions.

3. The receptacle of claim 1, wherein the controller is to further reconfigure the contacts based on changes in a state of the peripheral device including whether the peripheral device is connected to a direct power source or a battery power source.

4. The receptacle of claim 1, wherein the plug includes contacts to interface with the control channel of the receptacle, and a resistor coupled across the contacts of the plug that interface with the control channel, and wherein a level of the resistance indicates conditions of one or more of the peripheral device and the host device.

5. The receptacle of claim 1, wherein the plug includes contacts to interface with the control channel of the receptacle, and a capacitor coupled across the contacts of the plug that interface with the control channel, and wherein a level of the capacitance indicates conditions of one or more of the peripheral device and the host device.

6. The receptacle of claim 1, wherein the controller comprises a host interface controller to select from among available interface protocols associated with the bus type based on the peripheral device conditions.

7. The receptacle of claim 1, wherein the receptacle is communicatively coupled to a host computing device, and the contacts are configured based on the conditions of the peripheral device as well as the conditions of the host computing device.

8. A system, comprising:
   a receptacle including contacts to interface with a peripheral device;
   a plug to communicatively coupled the to the peripheral device via a cable;
   a control channel communicatively coupled to one or more of the contacts, the control channel to receive a data signal related to conditions of the peripheral device; and
   a controller communicatively coupled to the control channel to determine the conditions of the peripheral device and configure the contacts of the receptacle based on the determined conditions, wherein configuring the contacts comprises routing a first set of contacts corresponding to a first bus type to a first interface and routing a second set of contacts corresponding to a second bus type to a second interface, wherein the receptacle is communicatively coupled to a host computing device, and wherein the conditions comprise a request by the peripheral device to reconfigure one of the first or second set of contacts dynamically during communication between the host computing device and the peripheral device.

9. The system of claim 8, wherein the controller dynamically configures the first set of contacts and the second set of contacts based on changing usage conditions.

10. The system of claim 8, wherein the controller further reconfigures the contacts based on changes in a state of the peripheral device including whether the peripheral device is connected to a direct power source or a battery power source.

11. The system of claim 8, wherein the plug includes contacts to interface with the control channel of the receptacle, and a resistor coupled across the contacts of the plug that interface with the control channel, and wherein a level of the resistance indicates the conditions of the peripheral device.

12. The system of claim 8, wherein the plug includes contacts to interface with the control channel of the receptacle, and a capacitor coupled across the contacts of the plug that interface with the control channel, and wherein a level of the capacitance indicates conditions of one or more of the peripheral device and the host device.

13. The system of claim 8, wherein the controller comprises a host interface controller to select from among available interface protocols associated with the bus type based on the peripheral device conditions.

14. The system of claim 8, wherein the receptacle is communicatively coupled to a host computing device, and the contacts are configured based on the conditions of the peripheral device as well as the conditions of the host computing device.

15. The system of claim 8, wherein the receptacle is communicatively coupled to a host computing device, and wherein the conditions comprise one or more of:
   security protocols relating to a data encryption of the data signal provided from the peripheral device;
   hierarchical relationship between the host computing device and the peripheral device;
   conditions of the peripheral device including number of lanes, operational speeds, default mapping, lane mappings; and
   a request by the peripheral device to cause the host computing device to provide a data signal related to conditions of the host computing device.

16. A method, comprising:
   receiving, via contacts of a receptacle, a plug communicatively coupled to a peripheral device via a cable;
   receiving, via a control channel communicatively coupled to one or more of the contacts, a signal related to conditions of the peripheral device including a first bus type and a second bus type of the peripheral device;
   determining, via a controller communicatively coupled to the control channel, the conditions of the peripheral device; and
   configuring the contacts of the receptacle based on the determined conditions, wherein configuring the contacts comprises routing a first set of contacts corresponding to the first bus type to a first interface and routing a second set of contacts corresponding to the second bus type to a second interface, and wherein the receptacle is communicatively coupled to a host computing device, and wherein the conditions comprise a request by the peripheral device to reconfigure one of the first or second set of contacts dynamically during communication between the host computing device and the peripheral device.

17. The method of claim 16, further comprising dynamically configuring the first set of contacts and the second set of contacts based on changing usage conditions.

18. The method of claim 16, further comprising reconfiguring the contacts based on changes in a state of the peripheral device including whether the peripheral device is connected to a direct power source or a battery power source.

19. The method of claim 16, wherein the plug includes contacts to interface with the control channel of the receptacle, and a resistor coupled across the contacts of the plug that interface with the control channel, further comprising determining a level of the resistance to indicate the conditions of one or more of the peripheral device and the host device.

20. The method of claim 16, wherein the plug includes contacts to interface with the control channel of the receptacle, and a capacitor coupled across the contacts of the plug that interface with the control channel, further comprising determining a level of the capacitance to indicate the conditions of one or more of the peripheral device and the host device.

21. The method of claim 16, further comprising selecting from among available interface protocols associated with the bus type based on the peripheral device conditions.

22. The method of claim 16, wherein the receptacle is communicatively coupled to a host computing device, and the contacts are configured based on the conditions of the peripheral device as well as the conditions of the host computing device.

23. The method of claim 16, wherein the receptacle is communicatively coupled to a host computing device, and wherein the conditions comprise one or more of:
   security protocols relating to a data encryption of the data signal provided from the peripheral device;
   hierarchical relationship between the host computing device and the peripheral device;
   conditions of the peripheral device including number of lanes, operational speeds, default mapping, lane mappings; and
   a request by the peripheral device to cause the host computing device to provide a data signal related to conditions of the host computing device.

* * * * *